United States Patent
Palanisamy et al.

(10) Patent No.: US 10,569,902 B2
(45) Date of Patent: Feb. 25, 2020

(54) EXTERIOR AIRCRAFT LIGHT UNIT

(71) Applicant: Goodrich Lighting Systems GmbH, Lippstadt (DE)

(72) Inventors: Jai Ganesh Palanisamy, Karnataka (IN); Anil Kumar Jha, Lippstadt (DE); Andre Hessling-Von Heimendahl, Koblenz (DE); Abhilash Krishna, Karnataka (IN)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/167,652

(22) Filed: Oct. 23, 2018

(65) Prior Publication Data

US 2019/0118968 A1    Apr. 25, 2019

(30) Foreign Application Priority Data

Oct. 23, 2017 (EP) .................................. 17197748

(51) Int. Cl.
   *B64D 47/04* (2006.01)
   *F21V 29/75* (2015.01)
   *F21V 29/503* (2015.01)
   *F21W 107/30* (2018.01)
   *F21V 7/04* (2006.01)
   *F21V 7/00* (2006.01)

(52) U.S. Cl.
   CPC ............ *B64D 47/04* (2013.01); *F21V 29/503* (2015.01); *F21V 29/75* (2015.01); *F21V 7/0008* (2013.01); *F21V 7/04* (2013.01); *F21W 2107/30* (2018.01)

(58) Field of Classification Search
   CPC ......... B64D 47/04; F21V 7/04; F21V 29/503; F21V 29/75
   See application file for complete search history.

(56) References Cited

U.S. PATENT DOCUMENTS

| 8,439,531 B2 | 5/2013 | Trott et al. |
| 9,085,373 B2 | 7/2015 | Hessling Von Heimendahl et al. |
| 9,464,801 B2 | 11/2016 | Van De Ven et al. |
| 2002/0008976 A1 | 1/2002 | Gronemeier et al. |
| 2005/0259401 A1 | 11/2005 | Han et al. |
| 2006/0007012 A1 | 1/2006 | Machi et al. |
| 2006/0268525 A1 | 11/2006 | Jeong |
| 2009/0295263 A1 | 12/2009 | Braun et al. |
| 2015/0274320 A1 | 10/2015 | Jha |

OTHER PUBLICATIONS

Extended European Search Report for International Application No. 17197748.1 dated Apr. 11, 2018, 8 pages.

*Primary Examiner* — Joseph L Williams
(74) *Attorney, Agent, or Firm* — Cantor Colburn LLP (57) ABSTRACT

An exterior aircraft light unit according to exemplary embodiments of the invention comprises: a housing including a mounting portion, which is configured for mounting the aircraft light unit to an aircraft; at least one light source; and a heat sink; wherein the heat sink comprises: a first heat sink portion comprising a plurality of cooling ribs being thermally connected with the at least one light source for transferring heat from the at least one light source to the plurality of cooling ribs; and at least one second heat sink portion comprising two heat sink plates and a clamping pin and being configured such that the second heat sink portion is selectively attachable, particularly clampable, to a respective cooling rib of the first heat sink portion.

15 Claims, 10 Drawing Sheets

EXTERIOR AIRCRAFT LIGHT UNIT

FOREIGN PRIORITY

This application claims priority to European Patent Application No. 17197748.1 filed Oct. 23, 2017, the entire contents of which is incorporated herein by reference.

BACKGROUND

The present invention relates to an exterior aircraft light unit comprising a heat sink, in particular a heat sink in thermal connection with one or more light sources.

Almost all aircraft are equipped with exterior aircraft light units. In particular, large passenger air planes have a wide variety of exterior aircraft light units. Examples include a landing light unit, a taxi light unit, a runway turn-off light unit and a multi-functional light unit providing at least two of these functionalities.

Exterior aircraft light units may be provided with at least one heat sink for dissipating the heat generated by operating the light unit. The power requirements and space envelopes of each of these light units may vary as a function of external parameters which include the type of the aircraft, the respective position of installation of the light unit, such as a wing, a gear or the fuselage of the aircraft. Increased power requirements of the light unit result in an increased need for heat dissipation. This requires a larger heat sink providing more power dissipating ("cooling") capacity. Larger heat sinks, however, need more space for installation, which might not be available in every configuration and/or mounting position.

It therefore would be beneficial to provide an exterior aircraft light unit that is usable in a variety of different application scenarios.

SUMMARY

An exterior aircraft light unit according to exemplary embodiments of the invention comprises at least one light source; and a heat sink; wherein the heat sink comprises: a first heat sink portion comprising a plurality of cooling ribs being thermally connected with the at least one light source for transferring heat from the at least one light source to the plurality of cooling ribs; and at least one second heat sink portion comprising two heat sink plates and an attachment device and being configured such that the second heat sink portion is selectively attachable, particularly clampable, to a respective cooling rib of the first heat sink portion.

According to exemplary embodiments of the invention, the cooling capacity of the heat sink portion comprising a plurality of cooling ribs may be adjusted by selectively attaching or detaching at least one second heat sink portion to one of the cooling ribs. The second heat sink portion(s) can also be called cooling booster(s).

The number of second heat sink portions to be attached to respective cooling ribs of the first heat sink portion depends on the cooling needs. For example, one second heat sink portion can be attached to one cooling rib of the first heat sink portion, if a slightly enhanced cooling capacity is desired, two or more second heat sink portions can be attached to respective ones of two or more cooling ribs, if a higher cooling capacity is desired, and second heat sink portions can be attached to all the cooling ribs, if a maximum increase in cooling capacity is desired.

The at least one second heat sink portion can easily be attached, particularly clamped, to a respective cooling rib/ respective cooling ribs without any tooling, will survive harsh environment, is bullet proof in assembly, is locking into fixed position and provides for excellent cooling and heat transfer characteristics.

Moreover, the at least one second heat sink portion has a light weight. It is simple in construction with a very small number of parts needed and can be manufactured at low cost.

The at least one second heat sink portion provides cooling only by convective heat transfer, and is particularly effective when the at least one light source is formed as an LED. The at least one second heat sink portion is capable to maintain the operating temperature of the LED(s) at the intended operating temperature range only by natural convective heat transfer.

The at least one second heat sink portion is thin, obstructs no light and can therefore be placed along the light path without compromising the main functionality of the exterior aircraft light unit.

The attaching, particularly clamping and the detaching, particularly removing of the at least one second heat sink portion can be carried out easily without any additional tools or special skill and training required.

The second heat sink portion can be used for different cooling ribs and/or different exterior aircraft light units. One type/kind of second heat sink portion will fit to a wide range of exterior aircraft light units, particularly to their cooling ribs which adds to the cost efficiency.

The at least one second heat sink portion can be retrofitted to existing exterior aircraft light units, particularly to their cooling ribs by clamping the two heat sink plates of a second heat sink portion onto a respective cooling rib. The inner surfaces of the two heat sink plates make contact to the respective outer surfaces of the cooling rib, which provides for a good conductive heat transfer from the cooling rib to the respective second heat sink portion clamped thereto. The higher the contact areas between the two heat sink plates and the respective cooling rib is, the better the conductive heat transfer.

By a constant pressure between the two heat sink plates and the respective cooling rib, the second heat sink portion is reliably clamped and held in position with respect to the respective cooling rib.

A particularly reliable fixation of the second heat sink portion to the cooling rib can be attained if a positive lock is created. This embodiment allows to withstand the vibration and the inertial forces particularly well.

The attachment device can be formed as a clamping pin, as a screw, as a combination of at least one pair of screw and nut with the screw extending through aligned mounting holes provided in the first plate portions and the respective cooling rib, as a spring, particularly a torsion spring configured to push first plate portions of heat sink plates of the second heat sink portion towards each other and to clamp the respective cooling rib therebetween, or as a splint.

If the attachment device is formed as a clamping pin, which can also be called locking pin, a particularly user friendly and safe fixation of the second heat sink portion with respect to the cooling rib can be provided.

When retrofitting existing exterior aircraft light units with one or more second heat sink portions according to exemplary embodiments of the invention, no changes have to be made to the existing exterior aircraft light units, as long as they have cooling ribs onto which the one or more second heat sink portions can be attached, particularly clamped.

When retrofitting existing exterior aircraft light units with one or more second heat sink portions according to exemplary embodiments of the invention, as described herein the glazing of the exterior aircraft light unit has to be removed, or the exterior aircraft light unit has to be removed from behind the glazing. The one or more second heat sink portions are then attached, particularly clamped to the respective cooling ribs of the exterior aircraft light unit, and finally the glazing is attached again or the exterior aircraft light unit is mounted behind the glazing again.

Both heat sink plates can be at least one of identical and mirror images of one another to simplify manufacture and inventory control.

According to an embodiment, each of the two heat sink plates comprises a first plate portion at the first end of the heat sink plate, a second plate portion distal from the first end of the heat sink plate, and a clamping pin receiving and clamping space arranged between the first and second plate portions.

Such configuration is easy and cost-effective to manufacture and provides for a fast and easy attachment of the respective second heat sink portion to a cooling rib. The first plate portions at the first heat sink plate are attached, particularly clamped, to respective cooling rib and make contact to the cooling rib surfaces. Thereby a particularly effective conductive heat transfer is attained.

According to a further embodiment, the second plate portions distal from the respective first end of both heat sink plate are connected to each other, particularly integrally formed.

Such a configuration makes the attachment of the second heat sink portion to the respective cooling rib self-explaining, since it is apparent that the second heat sink portion can only be attached to the respective cooling rib by directing the first plate portions and the cooling rib receiving portion arranged therebetween into the direction of the cooling rib.

Furthermore, the conductive heat transfer area at the distal end of the second heat sink portion is further improved, and it is reliably avoided that the two heat sink plates of the second heat sink portion are undesirably separated from each other.

According to a further embodiment, the first and second plate portions lie substantially in the same plane, and the clamping pin receiving and clamping space is formed as indentation sections protruding out of the plane of the first and second plate portions and interrupted sections disposed between respectively adjacent indentation sections, seen in the direction of width of the respective heat sink plate.

According to a further embodiment, the two heat sink plates of the second heat sink portion are arranged such that the indentation sections of the clamping pin receiving and clamping space of one of its heat sink plates engage with the interrupted sections of the respective other heat sink plate, such that a clamping pin receiving and clamping space is formed in the direction of width of the respective heat sink plate, the clamping pin receiving and clamping space being confined by the inner surface areas of the opposing indentation sections.

According to a further embodiment, the clamping pin extends, at least partially, through the clamping pin receiving and clamping space.

With these embodiments, the clamping pin can be arranged within the clamping pin receiving and clamping space and can provide for an easy and convenient attaching, particularly clamping, and respectively, detaching, particularly removing action. Such second heat sink portion can be manufactured easily by bending and punching a metal sheet accordingly.

According to a further embodiment, the clamping pin comprises an oval or elliptical outer shape, and the clamping pin receiving and clamping space comprises an oval or elliptical shape.

A smaller diameter section of the clamping pin receiving and clamping space can lie in a plane that includes an angle, particularly a right angle, with respect to the plane of the first and second plate portions, such that a turning movement of the clamping pin causes a movement of the first ends of the two heat sink plates towards each other so as to clamp the second heat sink portion onto the respective cooling rib.

Such embodiment provides for a particularly efficient and reliable clamping of the first plate portions of the two heat sink plates of a second heat sink portion onto a respective cooling rib.

According to a further embodiment, one clamping pin is provided. The clamping pin can extend through the clamping pin receiving and clamping space, particularly through the clamping pin receiving and clamping space. The clamping pin can comprise a lateral handle portion at its first end. The lateral handle portion can be formed as a bent end portion of the clamping pin. The second end of the clamping pin can be formed as a bent end portion, preventing the clamping pin from moving out of the clamping pin receiving and clamping space. The clamping pin can be turned between a mounting position, in which the lateral handle portion extends at an angle, particularly at a right angle, with respect to the plane of the first and second plate portions, and in which the first ends of the first and second plate portions are at a greater distance from each other, such that the second heat sink portion, with its cooling rib receiving portion, can be moved onto and removed from a respective cooling rib, and a clamping position, in which the lateral handle portion lies in a plane between and parallel to the planes of the first and second plate portions and in which the first ends of the first and second plate portions are at smaller distance from each other, such that the second heat sink portion, with its cooling rib receiving portion, can be attached to, particularly clamped onto a respective cooling rib.

By grasping and turning the lateral handle portion at one end of the clamping pin, the clamping pin can be turned between the mounting position and the clamping position. The mounting and the clamping position can include an angle of for example 90 to 135 degrees with respect to a middle plane of the second heat sink portion.

If the lateral handle portion is formed as a bent end portion of the clamping pin, such clamping pin can be manufactured easily and cost efficiently.

If the other end of the clamping pin, namely the end of the clamping pin opposite to the lateral handle portion, is bent, for example by about 90 degrees, it is reliably avoided that the clamping pin inadvertently moves out of the clamping pin receiving and clamping space.

In the embodiments where only one clamping pin is provided per second heat sink portion, the second heat sink portion can be clamped onto the respective cooling rib and detached from the same by one grasping and turning action.

According to a further embodiment, two clamping pins are provided per second heat sink portion.

Each of the clamping pins can extend through part of the clamping pin receiving and clamping space, particularly through part of the clamping pin receiving and clamping space. Each of the clamping pins can comprise a lateral handle portion at its outer end. The lateral handle portion can be formed as a bent end portion of the clamping pin. Each of the clamping pins can be turned between a mounting position, in which the lateral handle portion extends at an angle, particularly at a right angle, with respect to the plane of the first and second plate portions, and in which the first ends of the first and second plate portions are at a greater distance from each other, such that the second heat sink portion, with its cooling rib receiving portion, can be moved onto and removed from a respective cooling rib, and a clamping position, in which the lateral handle portion lies in a plane between and parallel to the planes of the first and second plate portions and in which the first ends of the first and second plate portions are at smaller distance from each other, such that the second heat sink portion, with its cooling rib receiving portion, can be attached to, particularly clamped onto a respective cooling rib.

The advantages for the two clamping pins embodiment mainly correspond to the advantages of the one clamping pin embodiment, wherein providing and using two clamping pins per second heat sink portion reduces the torsion as compared to the one clamping pin embodiment.

According to a further embodiment, the two heat sink plates have first ends that are spaced apart from each other so as to form a cooling rib receiving portion therebetween. At least one notch can be provided at the cooling ribs and at least one corresponding protrusion can be provided at the first ends of the two heat sink plates, for engaging with the at least one notch of the respective cooling rib. At least one protrusion can be provided at the cooling ribs and at least one corresponding notch can be provided at the first ends of the two heat sink plates, for engaging with the at least one protrusion of the respective cooling rib.

By providing such notch-protrusion/protrusion-notch engagement, a positive lock between the second heat sink portion and the cooling rib is created and the second heat sink portion is held in space very reliably with respect to the cooling rib. Loosening or tilting of the second heat sink portion is reliably avoided.

The cooling rib receiving portion of each pair of heat sink plates can abut an opposing surface of the respective cooling rib to facilitate heat transfer between the cooling rib and the heat sink plates.

According to a further embodiment, the two heat sink plates and the clamping pin are configured and arranged such that a turning movement of the clamping pin causes a movement of the first ends of the two heat sink plates towards each other so as to clamp the second heat sink portion onto the respective cooling rib.

According to a further embodiment, at least one second heat sink portion is attached, particularly clamped, to a respective cooling rib of the first heat sink portion.

While independent claim 1 claims the combination of a first heat sink portion and of at least one second heat sink portion of the heat sink of the exterior aircraft light unit, wherein the second heat sink portion is selectively attachable, particularly clampable to a respective cooling rib of the first heat sink portion, this embodiment claims the attached, particularly clamped position of the at least one second heat sink portion with respect to a respective cooling rib of the first heat sink portion.

In a further embodiment, the exterior aircraft light unit further comprises a housing including a mounting portion, which is configured for mounting the aircraft light unit to an aircraft.

In a further embodiment, the at least one light source and the first heat sink portion of the heat sink are attached to a common support, in particular to a printed circuit board. The first heat sink portion in particular may be attached to a first side of the common support/printed circuit board, whereas the at least one light source may be attached to an opposing second side of the common support/printed circuit board. Mounting the at least one light source and the first heat sink portion to a common support allows for an effective transfer of heat from the at least one light source to the first heat sink portion.

In a further embodiment, the heat sink is arranged on a light emitting front side of the aircraft light unit. This allows to mount the first heat sink portion to a front-side of a support/printed circuit board supporting the at least one light source on an opposing back-side. The at least one light source may face at least one reflector, which is provided opposite to the at least one light source on the back-side of the support/printed circuit board. Such a configuration results in an exterior aircraft light unit having a compact structure and providing an efficient transfer of heat from the at least one light source to the first heat sink portion.

In a further embodiment, the first and/or second cooling ribs extend parallel to a direction of main light emission of the exterior aircraft light unit for minimizing the obstructing of the light emission caused by the cooling ribs.

In a further embodiment, the heat sink is arranged on a no light emitting rear side of the aircraft light unit, in particular on a back-side of a support/printed circuit board supporting the at least one light source and/or a reflector.

In a further embodiment, the at least one light source is at least one LED. In particular, the exterior aircraft light unit may comprise a plurality of light sources, in particular a plurality of LEDs.

In a further embodiment, the exterior aircraft light unit is an exterior aircraft light unit having an electrical power of more than 10 W, in particular an electrical power in the range of 10 W to 500 W, more particular an electrical power in the range of 50 W to 250 W. A heat sink according to exemplary embodiments of the invention is particularly effective for exterior aircraft light units operating in these power ranges.

In a further embodiment, the exterior aircraft light unit is at least one of a landing light unit, a taxi light unit, a runway turn-off light unit and a multi-functional light unit providing at least two of the functionalities of a landing light unit, a taxi light unit, and a runway turn-off light unit.

A landing light unit can be used for both landing and take-off procedures.

These light units are usually operated with high electrical power, in particular an electrical power in the range of 10 W to 500 W, more particularly an electrical power in the range of 50 W to 250 W. Thus, the use of a heat sink according to exemplary embodiments of the invention is particularly effective for these kinds of exterior aircraft light units.

The two heat sink plates can be machined from custom-made extruded aluminium or can be sheet-metal stamped. The clamping pin can be made out of strong, resilient material, for example steel, spring steel and the like.

An exterior aircraft light unit and a heat sink according to exemplary embodiments of the invention are described in more detail below with reference to the enclosed figures.

BRIEF DESCRIPTION OF THE FIGURES

FIG. 6 shows a perspective view of a first heat sink plate of the second heat sink portion of FIGS. 2 and 3 (FIG. 6(*a*)), a perspective view of a second heat sink plate of the second heat sink portion of FIGS. 2 and 3 (FIG. 6(*b*)); a perspective view of the two heat sink plates of FIGS. 6 (*a*) and (*b*) in their assembled state (FIG. 6 (*c*)); and a side view of the two heat sink plates of FIGS. 6 (*a*) and (*b*) in their assembled state (FIG. 6(*d*));

FIG. 7 shows a perspective view of a clamping pin of the second heat sink portion of FIGS. 2 and 3 according to a first version (FIG. 7(*a*)) and a perspective view of a clamping pin of the second heat sink portion of FIGS. 2 and 3 according to a second version (FIG. 7(*b*));

FIG. 8 shows a perspective view and three side views of the second heat sink portion and a respective cooling rib at different positions during the movement of the second heat sink portion onto the cooling rib with the lateral handle portion of the clamping in its mounting position (FIG. 8(*a*)); a side view and a perspective view of the second heat sink portion attached to the cooling rib at an intermediate position of the clamping pin between its mounting and its clamping positions (FIG. 8(*b*)) and a side view and a perspective view of the second heat sink portion attached to the cooling rib with the lateral handle portion of the clamping pin being in its clamping position (FIG. 8(*c*));

FIG. 9 shows a perspective view of the second heat sink portion and the respective cooling rib placed in a position before clamping the second heat sink portion onto the cooling rib, according to another embodiment of the present invention, with the first and second clamping pins of the second heat sink portion including their lateral handle portions being in their clamping position (FIG. 9(*a*)) and with the first clamping pin including its lateral handle portion being in the mounting position (FIG. 9(*b*)) and the second clamping pin including its lateral handle portion being in its clamping position;

FIG. 11 shows two perspective views (FIG. 11(*a*) and FIG. 11(*b*)) of a second heat sink portion and a cooling rib according to another embodiment of the present invention, in a position before clamping the second heat sink portion onto the cooling rib, with a spring loaded lock of the second heat sink portion being shown in an exploded view.

DETAILED DESCRIPTION

Figure 1:
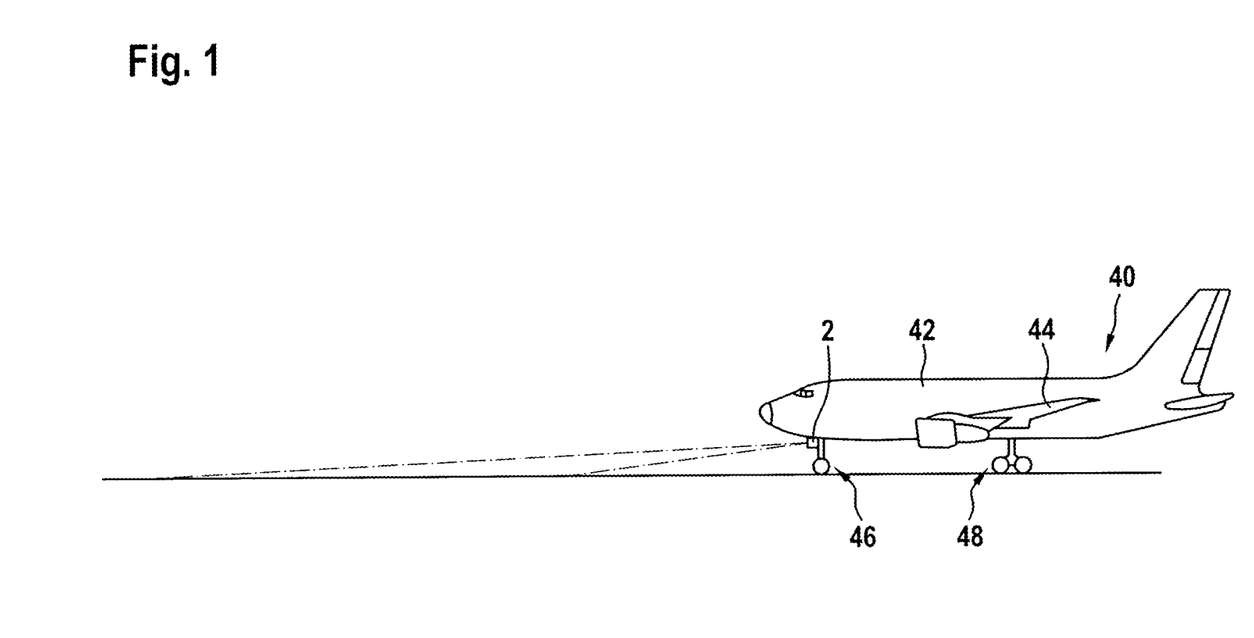
FIG. 1 shows an airplane comprising an exterior aircraft light unit according to an exemplary embodiment of the invention.

FIG. 1 depicts an airplane 40 comprising an exterior aircraft light unit 2 according to an exemplary embodiment of the invention which is mounted to a front running gear 46 of the airplane 40. Alternatively, the exterior aircraft light unit 2 may be mounted to the fuselage 42, a wing 44 or a main running gear 48 of the airplane 40.

Figure 2:
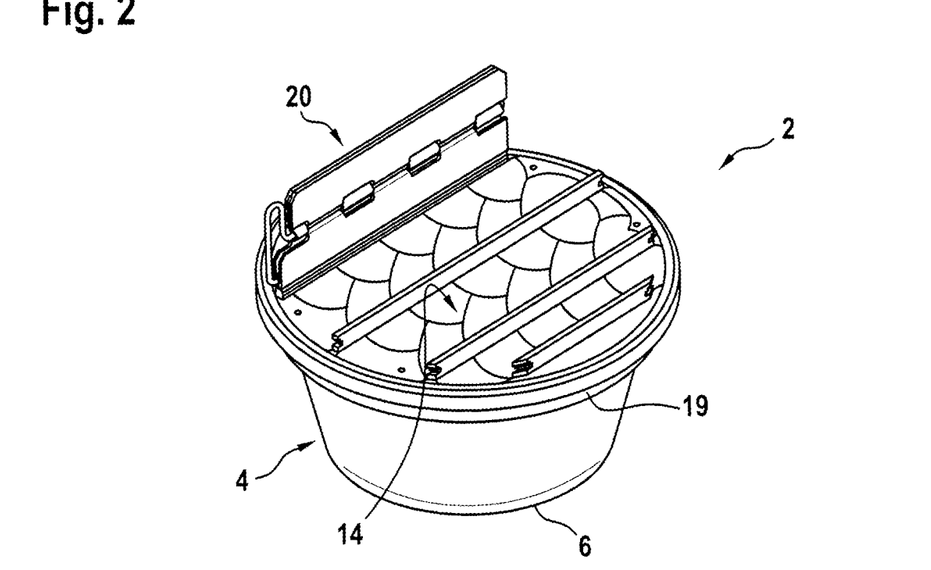
FIG. 2 shows a perspective view of an exterior aircraft light unit according to an exemplary embodiment of the invention.
Figure 3:
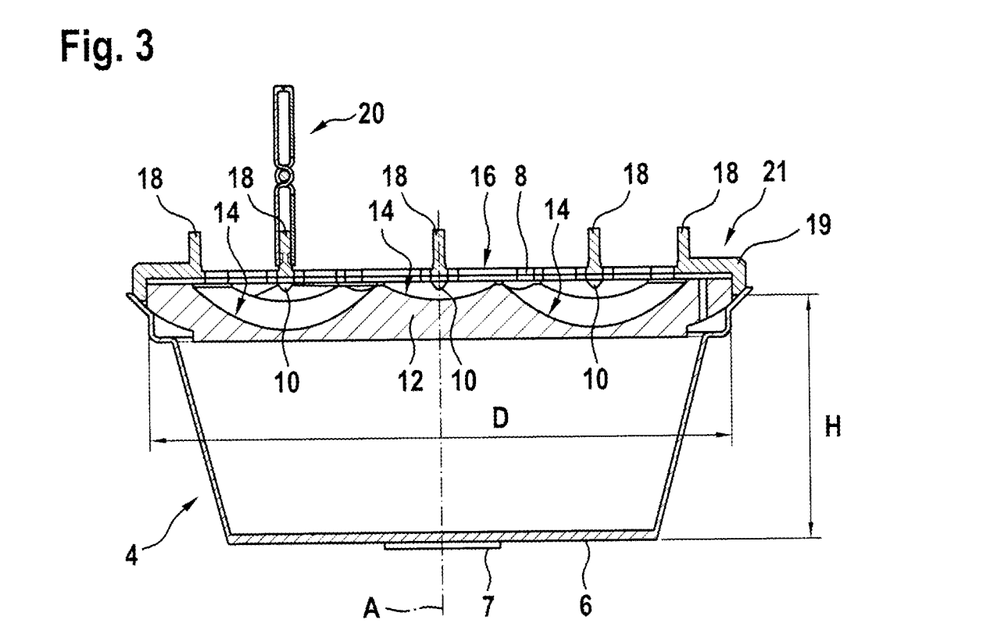
FIG. 3 shows a sectional view of the exterior aircraft light unit shown in FIG. 2.

FIG. 2 a shows a perspective view of an exterior aircraft light unit 2 according to an exemplary embodiment of the invention, and FIG. 3 shows a sectional view thereof.

The exterior aircraft light unit 2 comprises a cup-shaped housing 4 having a rear wall 6, which is shown at the bottom of FIGS. 1 and 2. The rear wall 6 comprises a mounting portion 7 (not shown in FIG. 2), which is configured for mounting the housing 4 to an aircraft 40, e.g. to the fuselage 42, the wing 44 or to the running gear 46, 48 of the airplane 40 (cf. FIG. 1).

The housing 4 may be have a cylindrical shape around an axis A. Alternatively, the housing 4 may have a conical shape, as it is shown in FIGS. 2 and 3. The skilled person will understand that other geometrical shapes of the housing 4 are possible as well.

The cup-shaped housing 4 may have a maximum diameter D of 150 mm to 250 mm, in particular a maximum diameter D of 175 mm to 225 mm, more particularly a maximum diameter D of 210 mm.

The height H of the housing may be in the range of 50 mm to 250 mm, in particular in the range of 175 mm to 225 mm, more particularly close to 210 mm.

A support plate 8 is provided at the open front side of the housing 4, i.e. at the side opposite to the rear wall 6. The support plate 8, which in particular may be a printed circuit board (PCB), supports electrical light sources 10, in particular LEDs. In the embodiment shown in FIGS. 2 and 3, the light sources 10 are arranged on the side of the support plate 8 facing the rear wall 6 of the housing 4. The light sources 10 can also be arranged on the rear faces of the cooling ribs 18 (see FIG. 5).

A reflector plate 12 is arranged between the support plate 8 and the rear wall 6 of the housing 4. A plurality of reflectors 14 facing the light sources 10 are formed within the reflector plate 12. As a result, light, which is emitted from the light sources 10, is reflected by the reflectors 14 to the light emitting front side of the exterior aircraft light unit 2. In the orientation of the exterior aircraft light unit 2 shown in FIGS. 2 and 3, the light emitting front side is the upper side. The number of reflectors 14 in particular corresponds with the number of light sources 10, i.e. a reflector 14 is associated with each light source 10, and vice versa.

The light sources 10 and the reflectors 14 may be arranged in a honeycomb structure, as it is illustrated in FIG. 2, on in any other structure which is suitable for generating the desired light distribution.

The support plate 8 is provided with windows/openings and/or formed at least partially transparent in order to allow the reflected light to pass through.

A heat sink 16, 20 is provided on the side of the support plate 8 which is opposite to the light sources 10.

The heat sink 16, 20 comprises a first heat sink portion 16 and a second heat sink portion 20. The first heat sink portion 16 comprises cooling ribs 16 and is attached to the support plate 8 and/or the housing 4.

One or more second heat sink portions 20 is/are selectively attachable to the first heat sink portion 16.

While FIGS. 2 and 3 only show one second heat sink portion 20 attached to one cooling rib 18, namely the second but last cooling rib 18, it is to be understood that two or more or even all cooling ribs 18 can be equipped with respective second heat sink portions 20 that are attached, particularly clamped thereto.

Attaching one or more second heat sink portions 20 to respective cooling ribs 18 increases the cooling capacity of the heat sink 16, 20 by increasing the volume and the heat transfer surface of the heat sink 16, 20.

Figure 4:
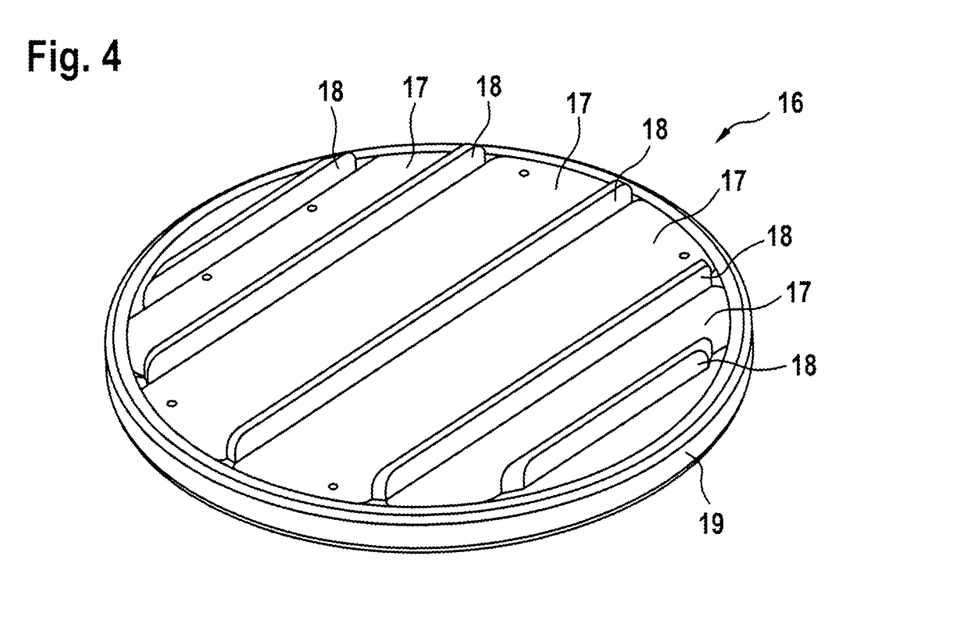
FIG. 4 shows a perspective view of a first heat sink portion of a heat sink according to an exemplary embodiment of the invention.

FIG. 4 shows a perspective view of the first heat sink portion 16.

The first heat sink portion 16 comprises a circular outer support ring 19 (first outer support ring 19), which is attached to the rim of the housing 4, when the first heat sink portion 16 is mounted thereto (cf FIG. 3). The skilled person will understand that the shape and the diameter of the first outer support ring 19 are set to correspond with the upper rim of the housing 4.

A plurality of first cooling ribs 18 extend parallel to each other across the first support ring 19. A plurality of intermediate plates 17, which are at least partially transparent in order to allow emitted light to pass through, extend between the first cooling ribs 18.

The first cooling ribs 18 may have a height hi of 5 mm to 10 mm, in particular in the range of 6 mm to 8 mm, more particular 7.5 mm (cf FIG. 3).

Figure 5:
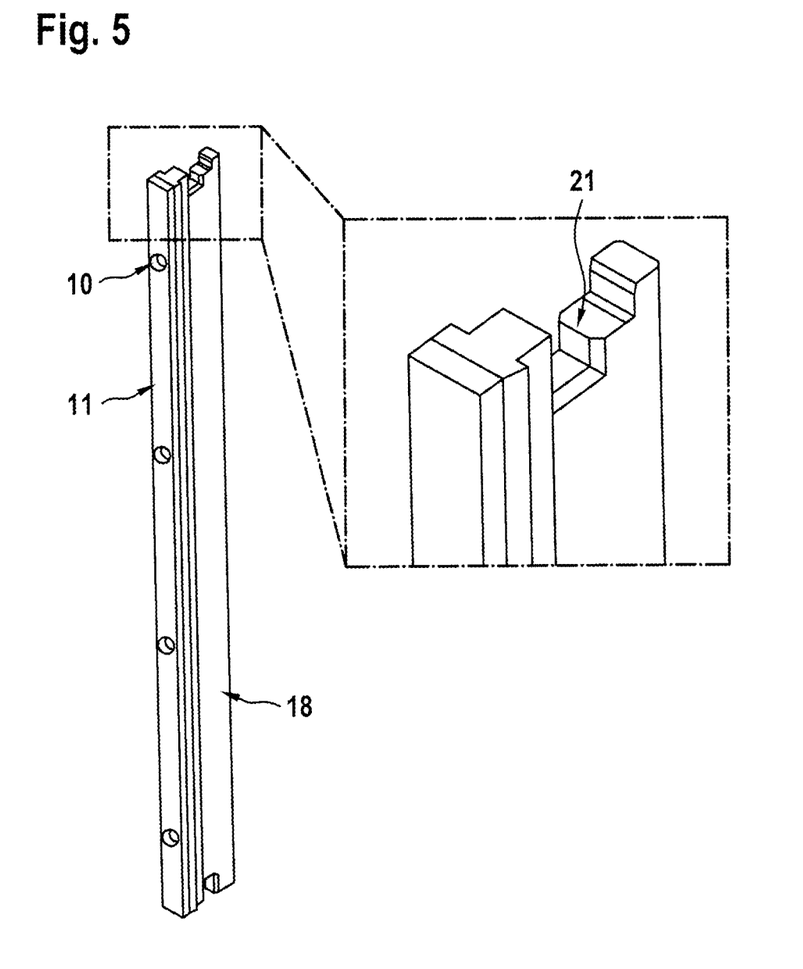
FIG. 5 shows a respective rear view of a cooling rib of the exterior aircraft light unit of FIGS. 2 to 4 and an enlarged detail of its lateral end portion.

FIG. 5 shows a respective rear view of a cooling rib 18 of the exterior aircraft light unit 2 and an enlarged detail of its lateral end portion.

The cooling rib 18 comprises a printed circuit board 11 and a number of light sources, particularly LEDs 10 at its rear end and a cooling rib heat conductivity portion extending therefrom in front direction.

At the lateral edges the cooling rib heat conductivity portion comprises an engagement notch 21 which is formed, seen from front to back, in a-step like fashion, such that the edge portion adjacent the printed circuit board 10 portion is at a distance from the plane in which the front and rear edge portion of the cooling rib 18 lie. This engagement notch 21 can well be seen in the enlarged view of the left end portion of the cooling rib 18.

Figure 6:
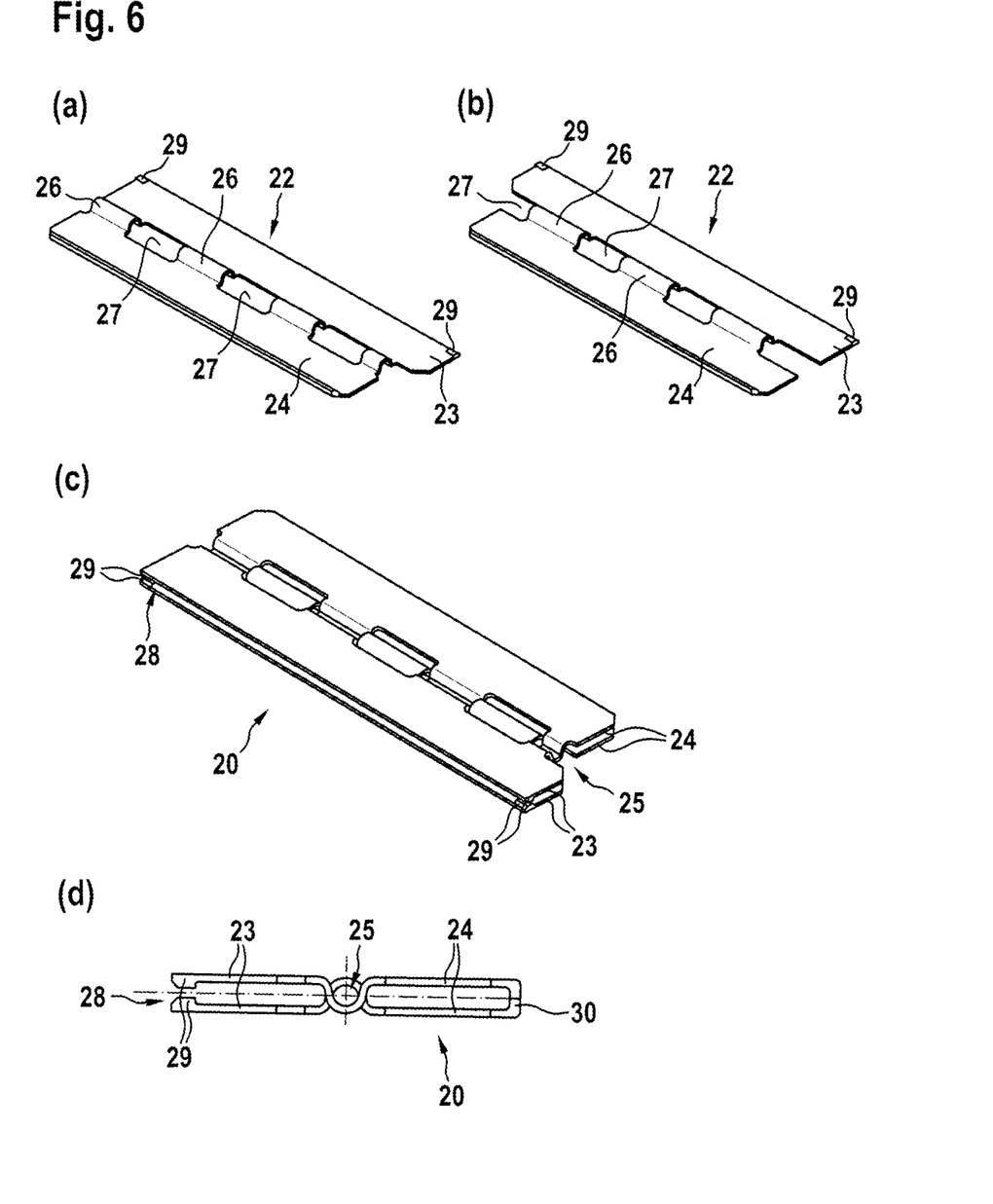

FIG. 6 shows a perspective view of a first heat sink plate 22 of a second heat sink portion 20 (FIG. 6(a)), a perspective view of a second heat sink plate 22 of the second heat sink portion 20 (FIG. 6(b)); a perspective view of the two heat sink plates 22 of FIGS. 6(a) and (b) in their assembled state (FIG. 6 (c)); and a side view of the two heat sink plates 22 of FIGS. 6 (a) and (b) in their assembled state (FIG. 6(d)).

The heat sink plates 22 are of longitudinal shape and have a width which is greater than its depth. Particularly, the width is such that it can be clamped onto a cooling rib 18 of an aircraft light unit 2 as shown in FIGS. 2, 3, and 4 and extends over at least a substantial part of the width of the respective cooling rib 18 onto which the second heat sink portion 20 is clamped.

The heat sink plates 22 of FIGS. 6(a) and (b) comprise, respectively, seen from front to back a first plate portion 23, a clamping pin receiving and clamping space 25 and a second plate portion 24 distal from the front end of the first plate portion 23. The clamping pin receiving and clamping space 25 is arranged between the first and second plate portions 23, 24. The first and second plate portions 23 and 24 lie substantially in the same plane.

The clamping pin receiving and clamping space 25 is formed as indentation sections 26 protruding out of the plane of the first and second plate portion 23, 24 and as interrupted sections 27 disposed between respectively adjacent indentation sections 26, seen in the direction of width of the heat sink plate 22.

The indentation sections 26 extend upwardly from the plane of the first and second plate portions 23, 24 and are of rounded shape, seen in the direction from front to back of the heat sink plate 22.

The indentation sections 26 of the second heat sink plate 22 of FIG. 6(b) have a width that equals or is slightly smaller than the width of the interrupted sections 27. Likewise, the width of the indentation sections 26 of the first heat sink plate 22 of FIG. 6(a) equals or is slightly smaller than the width of the interrupted sections 27 of the second heat sink plate 22 of FIG. 6(b).

Engagement protrusion 29 protruding upwardly from the planes of the first and second plate portions 23, 24 of the heat sink plates 22 are arranged at the left and right corner portions at the front ends of the heat sink plates 22.

While the first heat sink plates 22 are shown as separate parts in FIGS. 6(a) and (b) they can be connected at their rear ends by a connection portion 30, as can well be seen in FIG. 6(b).

In the assembled state of the second heat sink portion 20 as it is shown in FIGS. 6(c) and (d) the second heat sink plate 22 of FIG. 6(b) is turned and mounted to the first heat sink plate 22 of FIG. 6(a) such that its indentation sections 26 extend through the interrupted sections 27 of the first heat sink plate 22 and such that the indentation section 26 of the first heat sink plate 22 extend through the interrupted sections 27 of the second heat sink plate 22 and such that the clamping pin receiving and clamping space 25 is formed in the direction of width of the second heat sink portion 20 and confined by the inner surface areas of the opposing indentation sections 27.

In the assembled state of the heat sink plates 22 (FIGS. 6(c) and (d)) the first plate portions 23 and the second plate portions 24 of the two heat sink plates 22 are spaced apart from each other and particularly lie in parallel planes, enclosing a middle plane therebetween.

Furthermore, the front ends of the first plate portions 23 substantially lie in the same plane, and the engagement protrusions 29 at the left and right corner portions of the first plate portions 23 oppose each other. A cooling rib receiving portion 28 is formed between the first plate portions 23.

As can well be seen in FIG. 6(c), the width of the second plate portions 24 and of the clamping pin receiving and clamping space 25 is smaller than the width of the first plate portions 23 such that a recess is formed at a medium to rear portion of the right hand side of the second plate portions 24 and of the clamping pin receiving and clamping space 25. This recess is used to accommodate a lateral handle portion 33 of the clamping pin 32, see FIGS. 8(b) and (c).

In FIG. 6(d) it can well be seen that the shape of the clamping pin receiving and clamping space 25 is not exactly circular but rather has a roughly oval shape with a smaller diameter section extending in a plane perpendicular to the middle plane of the second heat sink portion 20 and with a greater diameter section extending in that middle plane.

Figure 7:
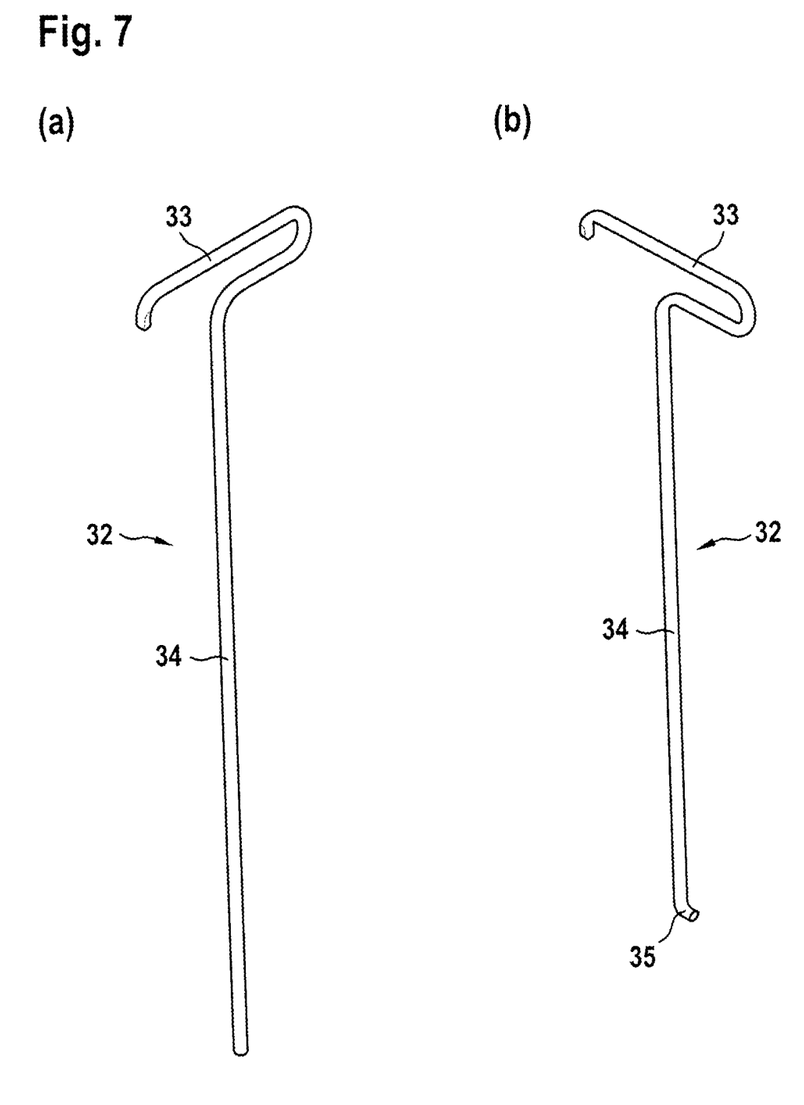

FIG. 7 shows a perspective view of a clamping pin 32 of the second heat sink portion 20 according to a first version (FIG. 7(a)) and a perspective view of a clamping pin 32 of the second heat sink portion 20 according to a second version (FIG. 7(b)).

It is to be noted that instead of a clamping pin 32, a screw, a spring or a splint can be provided to clamp the second heat sink portions 20 onto respective cooling ribs 18.

The clamping pin 32 of both embodiments of FIGS. 7(a) and (b) comprises a straight pin body 24 of oval or elliptical shape and a lateral handle portion 33 formed at one end of the pin body 34.

The lateral handle portion 33 is formed by a bent end portion of the pin body 34. Particularly, the pin body 34 is bent outwardly in a radial direction so as to form a first radial handle portion section, is bent again about 180° degrees so as to form a second radial handle portion section extending radially in the direction opposite to the first handle portion section. The second handle portion section extends across the axis of the pin body 34 and terminates in a rearwards bent end portion.

The length of the pin body 34 can be such that it extends, in the mounted state of the second heat sink portion 20, fully through the clamping pin receiving and clamping space 25. In this case, the other end of the pin body 34 opposite to the handle portion 33 can be formed as bent end portion 35, as shown in FIG. 7 (b). Such bent end portion 35 prevents the clamping pin 32 from inadvertently moving out of the clamping pin receiving and clamping space 25.

In another embodiment, the length of the pin body 34 can be approximately half of the width of the clamping pin receiving and clamping space 25. In this embodiment, two such clamping pins 32 can be inserted into the clamping pin receiving and clamping space 25 from opposite ends of the clamping pin receiving and clamping space 25.

The pin body 34 has a smaller diameter portion and a greater diameter portion. The greater diameter portion of the pin body 34 is in the direction of the radial handle portion sections, and the smaller diameter portion of the pin body 34 is thus located at the left and right hand sides of the pin body 34, seen with respect to the radial handle portion sections.

Figure 8:
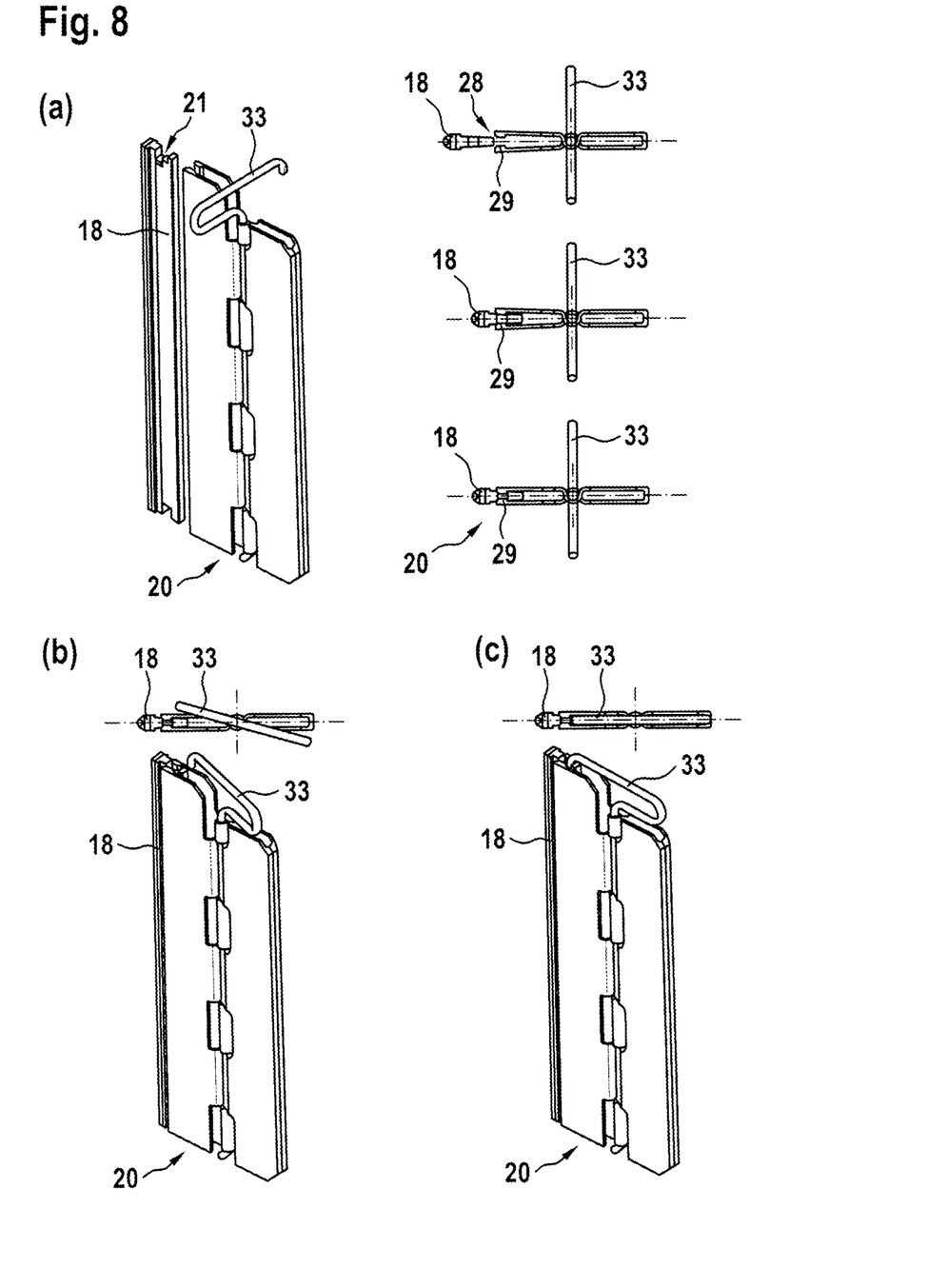

FIG. 8 shows a perspective view and three side views of the second heat sink portion 20 and a respective cooling rib 18 at different positions during the movement of the second heat sink portion 20 onto the cooling rib 18 with the lateral handle portion 33 of the clamping pin 32 in its mounting position (FIG. 8(a)); a side view and a perspective view of the second heat sink portion 20 attached to the cooling rib 18 at an intermediate position of the clamping pin 32 between its mounting and its clamping positions (FIG. 8(b)) and a side view and a perspective view of the second heat sink portion 20 attached to the cooling rib 18 with the lateral handle portion 33 of the clamping pin 32 being in its clamping position (FIG. 8(c)).

In FIG. 8, the clamping pin 20 has been inserted with its pin body 34 into the clamping pin receiving and clamping space 25.

If the clamping pin 32 is formed with a bent end portion 35, this bent end portion 35 can extend out of the clamping pin receiving and clamping space 25 at the end opposite the end where the lateral handle portion 33 is situated, as can well be seen in FIGS. 8(a) and (b).

In FIG. 8(a), the lateral handle portion 33 and the entire clamping pin 32 are arranged at an angle of about 90° degrees with respect to the middle plane of the second heat sink portion 20.

By having turned the lateral handle portion 33 and thus the entire clamping pin 32 by about 90° degrees, the greater diameter section of the pin body 34 has pushed the indentation sections 26 and thus the first plate portions 23 outwardly such that the cooling rib receiving portion 28 between the first plate portions 23 has been broadened. With such broadened cooling rib receiving portion 28, the second heat sink portion 20 can be moved onto the cooling rib 18. Different positions of the second heat sink portions 20 with respect to the cooling rib 18 during such sliding movement are shown in FIG. 8(a).

In the lowermost side view of FIG. 8(a), the engagement protrusions 29 at the corners portions of the first plate portions 23 engage with the respective notches 21 at the lateral side ends of the cooling rib 18. In this position, also the front ends of the first plate portions can abut against a broadened portion of the cooling rib 18.

Having reached this fully slid-in position, the clamping pin 32 is turned from the mounting position to a clamping position as shown in FIG. 8(c) in which the lateral handle portion 33 lies in the middle plane of the second heat sink portion 20 and in which the radial handle portion sections 33 are accommodated in the recess at the medium to rear portion of the right hand side of the second plate portions 24 and of the clamping pin receiving and clamping space 25.

An intermediate position between the mounting position of FIG. 8(a) and the clamping position of FIG. 8(c) is shown in FIG. 8(b). In this intermediate position, the lateral handle portion 33 includes an angle of about 15°-20° degrees with respect to the middle plane of the second heat sink portion 20.

A turning movement of the clamping pin 32 from the clamping position of FIG. 8(c) to the mounting position of FIG. 8(a) causes a movement of the indentations sections 26 and the first plate portions 23 of the opposing heat sink plates 22 away from each other such that cooling rib receiving portion 28 is broadened.

Likewise, a turning movement from the mounting position of FIG. 8(a) to the clamping position of FIG. 8(c) causes a movement of the indentations sections 26 and the first plate portions 23 of the heat sink plates 22 towards each other so as to clamp the second heat sink portions 20 onto the respective cooling rib 18.

Both movements cause the pin body of oval or elliptical shape 34 to push the indentation sections 26 of the clamping pin receiving and clamping space 25 outwardly and to release the same again.

Figure 9:
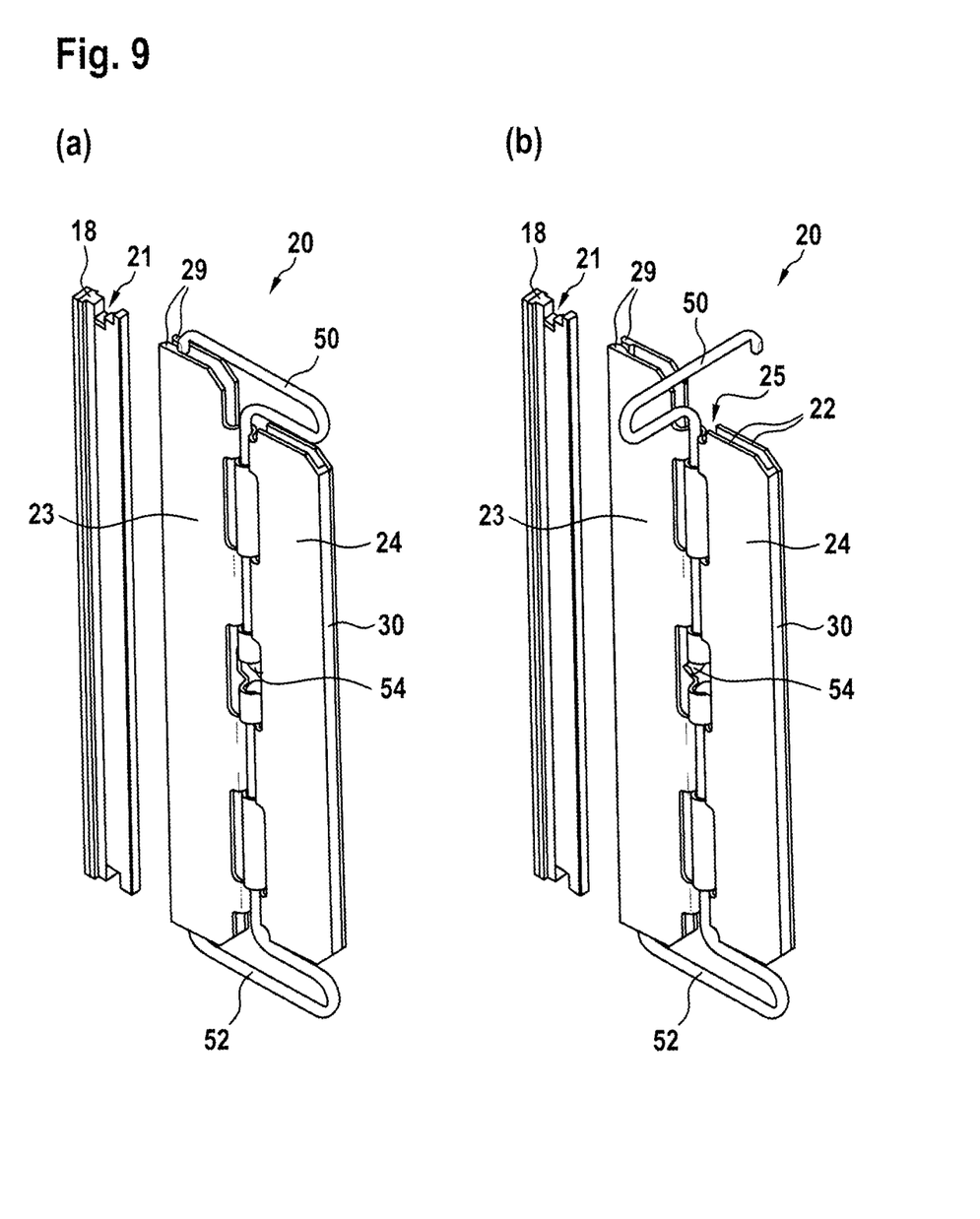

FIG. 9 shows a perspective view of the second heat sink portion 20 and the respective cooling rib 18 placed in a position before clamping the second heat sink portion 20 onto the cooling rib 18, with the first and second clamping pins 50, 52 of the second heat sink portion 20 including their lateral handle portions being in their clamping position (FIG. 9(a)) and with the first clamping pin 50 including its lateral handle portion being in the mounting position and the second clamping pin 52 including its lateral handle portion being in its clamping position.

The cooling rib 18 of FIG. 9 is identical to the cooling rib 18 as shown in FIGS. 5 and 8 and also includes a lateral engagement notch 21.

The second heat sink portion 20 of FIG. 9 also corresponds to the second heat sink portion 20 as shown and described with respect to FIGS. 6, 7 and 8 with the following exceptions:

Instead of one clamping pin 32 two clamping pins, namely a first clamping pin 50 and a second clamping pin 52 are provided. Both clamping pins 50 and 52 have a lateral handle portion and a pin body of oval, elliptical shape.

The width of the second plate portions 24 and of the clamping pin receiving and clamping space is smaller than the width of the first plate portions 23 such that a first recess is formed at a medium to rear portion of the right hand side of the second plate portions 24 and of the clamping pin receiving and clamping space, and a second recess is formed at a medium to rear portion of the left hand side of the second plate portions 24 and of the clamping pin receiving and clamping space.

The first recess is used to accommodate the lateral handle portion of the first clamping pin 50, and, likewise, the second recess is used to accommodate the lateral handle portion of the second clamping pin 52.

The shape of the pin body of both clamping pins 50 and 52 corresponds to the shape of the pin body 34 of the clamping pin 52 as explained with respect to FIG. 7.

The pin bodies of the first and second clamping pins 50, 52 extend through only part of the width of the clamping pin receiving and clamping space, particularly through half of the width or less than half the width of the clamping pin receiving and clamping space, respectively.

Each of the clamping pins 50, 52 can be turned between a mounting position (position of the first clamping pin in FIG. 9(b) and a clamping position (positions of the clamping pins 50, 52 in FIG. 9(a) and position of the second clamping pin 52 in FIG. 9(b). The mounting and clamping positions of each of the clamping pins 50, 52 and the movement from the mounting to the clamping positions and vice versa correspond to those explained with respect to FIG. 8. This will not be repeated here for brevity.

Furthermore a locking bend 54 is provided which can lock the second heat sink portion 20 in its clamping position.

Figure 10:
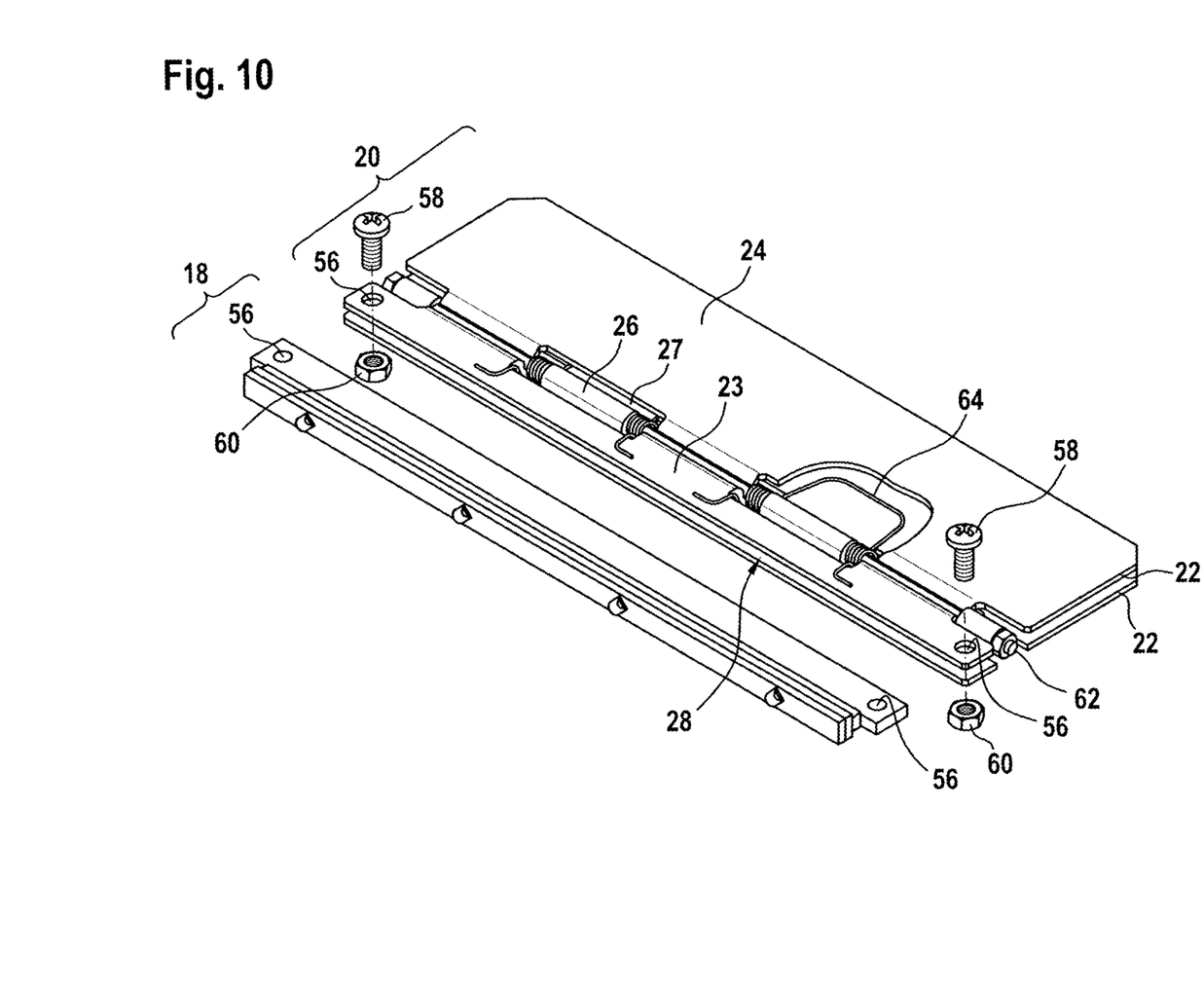
FIG. 10 shows a perspective view of a second heat sink portion and a respective cooling rib according to another embodiment of the present invention, in a position before clamping the second heat sink portion onto the cooling rib.

FIG. 10 shows a perspective view of a second heat sink portion 20 and a respective cooling rib 18, in a position before clamping the second heat sink portion 20 onto the cooling rib 18.

Figure 11:
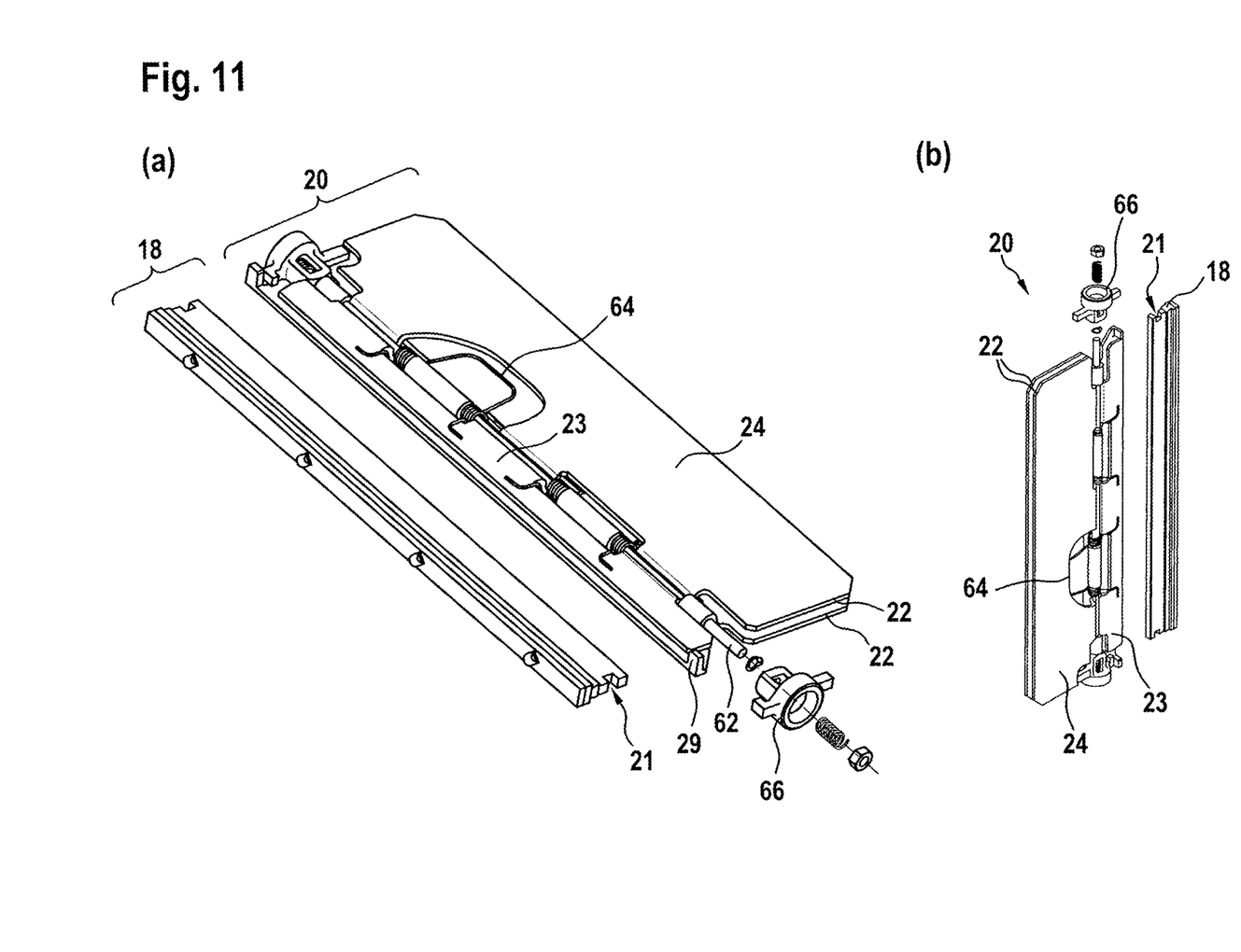

The length of the first plate portions 23 of the second heat sink portion 20 of FIGS. 10 and 11 is shorter than the length of the first plate portions 23 of the second heat sink portion 20 as shown in FIGS. 6 and 8.

The front ends of the two heat sink plates 22 at their first plate portions 23 are spaced apart from each other so as to form a cooling rib receiving portion 28 therebetween.

Mounting holes 56 are provided at the lateral ends of the first plate portions 23 and they align with corresponding mounting holes 56 provided at the lateral ends of the cooling rib heat conductivity portion of the cooling rib 18.

The second heat sink portion 20 is attached to the cooling rib 18 by moving the heat sink portion 20 onto the cooling rib 18 such that the cooling rib heat conductivity portion is received in the cooling rib receiving portion 28 between the first plate portions 23 of the two heat sink plates 22 of the second heat sink portion 20 and such that the mounting holes 56 at the lateral ends of the first plate portions 23 align with the mounting holes 56 at the lateral ends of the cooling rib heat conductivity portion. Then, screws 58 are inserted from one side to extend through the aligning mounting holes 56, and they are screwed against nuts 60 at the other side of the second heat sink portion 20 and the cooling rib 18.

Furthermore, one or more torsion springs 64 can be provided that push the first plate portions 23 towards each other in the embodiment of FIG. 10. These torsion springs 64 can comprise coils which are arranged around the pin 62 which extends through the clamping pin receiving and clamping space, at positions of width between adjacent indentation sections 26 and interrupted sections 27, respectively. The ends of these torsion springs 64 are arranged such that the first plate portions 23 are pushed towards each other. In the exemplary embodiment of FIG. 10 the first ends of these torsion springs 64 are arranged above the first plate portion 23 and the second ends of the torsion spring 64 are arranged above the second plate portion 24 of the second heat sink plate 22, and a pushing force is applied, by these torsion springs 64 in a downward direction both to the first plate portion 23 of the first heat sink plate 22 and to the second plate portion 24 of the second heat sink plate 22 so as to clamp the inner surfaces of the first plate portions 23 firmly against the outer surfaces of the cooling rib heat conductivity portion of the cooling rib 18.

The second ends of adjacent torsion springs 64 are shown to be connected to each other and to have a U-shape, such that two adjacent torsion springs 64 form a combined torsion spring.

The pin 62 extends through the clamping pin receiving and clamping space. It can have a circular pin body shape, and the lateral ends of this pin 62 can be provided with respective sleeves and/or nuts in order to prevent the clamping pin 62 from moving out of the clamping pin receiving and clamping space in lateral direction.

The torsion spring(s) 64 provide(s) clamping pressure. If a pin 62 comprising a round pin body is used along with one or more torsion springs 64, the second heat sink portion 20 acts like binder clip.

The second heat sink portion 20 can be attached to a respective cooling rib 18 like a clip, and the connection can additionally be secured by using fasteners that can be formed as a screw 58 extending through aligned mounting holes 56 and can be screwed against a correspond nut 60.

It is to be noted at that point, that the embodiment of FIG. 10 works well also without such screws 58, aligned mounting holes 56, and nuts 60 and can also be formed without these elements. These elements are only optional and make the connection between the second heat sink portion 20 and the respective cooling rib 18 more secure and reliable.

FIG. 11 shows two perspective views (FIG. 11(a) and FIG. 11(b)) of a second heat sink portion 20 and a cooling rib 18, in a position before clamping the second heat sink portion 20 onto the cooling rib 18, with a spring loaded lock 66 of the second heat sink portion 20 being shown in an exploded view.

The cooling rib 18 of FIG. 11 corresponds to the cooling rib 18 of FIG. 5 and also has lateral engagement notches 21 to engage with corresponding engagement protrusions 29 that are provided at at least one of the corner portions of the first plate portions 23 of the second heat sink portion 20.

In the embodiment of FIG. 11 lateral engagement protrusions 29 are provided at the lateral ends of the first plate portion 23 of the second heat sink plate 22. They are situated laterally besides the lateral ends of the second plate portion 24 and they extend to a position of height lying in the plane of the upper surface of the second plate portion 24 or slightly lower than this plane.

The torsion springs 64 correspond to the torsion springs 64 of FIG. 10, and their description is not repeated here for brevity.

Again, the pin 62 is formed with a pin body of substantially circular shape, and it extends through the clamping pin receiving and clamping space. At the lateral ends of the pin body that protrude out of the clamping pin receiving and clamping space, spring loaded locks 66 are provided for fastening the pin 22 safely within the clamping pin receiving and clamping space while allowing for a movement of the first and second heat sink plates 22 around such clamping pin 62.

The spring loaded locks 66 comprise an outer nut, a spring, a sleeve element and a ring, respectively. The sleeve element of the spring loaded lock 66 has a protrusion at its front end configured to engage with the engagement notch 21 of the cooling rib 18. Such spring loaded lock 66 of the second heat sink portion 20 will engage with the engagement notch 21 of the cooling rib 18 to secure the fixation.

By pushing the second heat sink plates 24 that are not connected in this embodiment, towards each other, the cooling rib receiving portion 28 can be broadened. In this position, the second heat sink portion 20 can be moved onto the cooling rib 18, and the second heat sink plates 24 can then be released. The torsion springs 64 clamp the first plate portions 23 onto the surfaces of the cooling rib heat conductivity portion of the cooling rib 18 and the engagement protrusions 29 engage with the engagement notches 21.

The embodiment of FIG. 11 works like a binder clip, as explained with respect to FIG. 10. However, for the attachment of the second heat sink portion 20 to the cooling rib 18, spring loaded locks 66 instead of fasteners are provided for quick fixation.

Again the spring lock 66 is only optional. The embodiment of FIG. 11 works well without such spring loaded lock 66.

The invention claimed is:

1. An exterior aircraft light unit comprising:
    at least one light source; and
    a heat sink;
    wherein the heat sink comprises:
        a first heat sink portion comprising a plurality of cooling ribs being thermally connected with the at least one light source for transferring heat from the at least one light source to the plurality of cooling ribs; and
        at least one second heat sink portion comprising two heat sink plates and an attachment device and being configured such that the second heat sink portion is clampable to a respective cooling rib of the first heat sink portion.

2. The exterior aircraft light unit according to claim 1, wherein the attachment device is formed as a clamping pin, as a screw, as a combination of at least one pair of screw and nut with the screw extending through aligned mounting holes provided in the first plate portions and the respective cooling rib, as a spring configured to push first plate portions of heat sink plates of the second heat sink portion towards each other and to clamp the respective cooling rib therebetween, or as a splint.

3. The exterior aircraft light unit according to claim 1, wherein each of the two heat sink plates comprise a first plate portion at the first end of the heat sink plate, a second plate portion distal from the first end of the heat sink plate, and a clamping pin receiving and clamping space arranged between the first and second plate portions.

4. The exterior aircraft light unit according to claim 3, wherein the second plate portions distal from the respective first end of both heat sink plate are connected to each other, particularly integrally formed.

5. The exterior aircraft light unit according to claim 4, wherein the first and second plate portions lie substantially in the same plane, and the clamping pin receiving and clamping space is formed as indentation sections protruding out of the plane of the first and second plate portions and interrupted sections disposed between respectively adjacent indentation sections, seen in the direction of width of the respective heat sink plate; or
    wherein the two heat sink plates of the second heat sink portion are arranged such that the indentation sections of the clamping pin receiving and clamping space of one of its heat sink plates engage with the interrupted sections of the respective other heat sink plate, such that a clamping pin receiving and clamping space is formed in the direction of width of the respective heat sink plate, the clamping pin receiving and clamping space being confined by the inner surface areas of the opposing indentation sections; or
    wherein the clamping pin extends, at least partially, through the clamping pin receiving and clamping space.

6. The exterior aircraft light unit according to claim 3, wherein the clamping pin comprises an oval or elliptical outer shape, and/or the clamping pin receiving and clamping space comprises an oval or elliptical shape, and
    wherein a smaller diameter section of the clamping pin receiving and clamping space lies in a plane that includes an angle, particularly a right angle, with respect to the plane of the first and second plate portions, such that a turning movement of the clamping pin causes a movement of the first ends of the two heat sink plates towards each other so as to clamp the second heat sink portion onto the respective cooling rib.

7. The exterior aircraft light unit according to claim 3,
    wherein one clamping pin is provided;
    wherein the clamping pin extends through the clamping pin receiving and clamping space;
    wherein the clamping pin comprises a lateral handle portion at its first end, and
    wherein the lateral handle portion is formed as a bent end portion of the clamping pin;
    wherein the second end of the clamping pin is formed as a bent end portion, preventing the clamping pin from moving out of the clamping pin receiving and clamping space;
    wherein the clamping pin can be turned between a mounting position, in which the lateral handle portion extends at an angle, particularly at a right angle, with respect to the plane of the first and second plate portions, and in which the first ends of the first plate portions are at a greater distance from each other, such that the second heat sink portion, with its cooling rib receiving portion, can be moved onto and removed from a respective cooling rib, and a clamping position, in which the lateral handle portion lies in a middle plane between the planes of the first and second plate portions and in which the first ends of the first plate portions are at smaller distance from each other, such that the second heat sink portion, with its cooling rib receiving portion, can be attached to, particularly clamped onto a respective cooling rib.

8. The exterior aircraft light unit according to claim 3,
    wherein two clamping pins are provided, each of the clamping pins extending through part of the clamping pin receiving and clamping space;
    wherein each of the clamping pins comprises a lateral handle portion at its outer end, and
    wherein the lateral handle portion is formed as a bent end portion of the clamping pin; and
    wherein each of the clamping pins can be turned between a mounting position, in which the lateral handle portion extends at an angle, particularly at a right angle, with respect to the plane of the first and second plate portions, and in which the first ends of the first and second plate portions are at a greater distance from each other, such that the second heat sink portion, with its cooling rib receiving portion, can be moved onto and removed from a respective cooling rib, and a clamping position, in which the lateral handle portion lies in a plane between and parallel to the planes of the first and second plate portions and in which the first ends of the first and second plate portions are at smaller distance from each other, such that the second heat sink portion, with its cooling rib receiving portion, can be attached to, particularly clamped onto a respective cooling rib.

9. The exterior aircraft light unit according to claim 1,
    wherein the two heat sink plates have first ends that are spaced apart from each other so as to form a cooling rib receiving portion therebetween; and
    wherein at least one notch is provided at the cooling ribs and at least one corresponding protrusion is provided at the first ends of the two heat sink plates, for engaging with the at least one notch of the respective cooling rib; or wherein at least one protrusion is provided at the cooling ribs and at least one corresponding notch is provided at the first ends of the two heat sink plates, for engaging with the at least one protrusion of the respective cooling rib.

10. The exterior aircraft light unit according to claim 9, wherein the two heat sink plates and the clamping pin are configured and arranged such that a turning movement of the clamping pin causes a movement of the first ends of the two heat sink plates towards each other so as to clamp the second heat sink portion onto the respective cooling rib.

11. The exterior aircraft light unit according to claim 1, wherein at least one second heat sink portion is attached, particularly clamped, to a respective cooling rib of the first heat sink portion.

12. The exterior aircraft light unit according to claim 1, further comprising a housing including a mounting portion, which is configured for mounting the aircraft light unit to an aircraft.

13. The exterior aircraft light unit according to claim 1, wherein the at least one light source and the at least one first heat sink portion are attached to a common support, in particular to a printed circuit board; and wherein the heat sink is arranged on a light emitting front side of the aircraft light unit, wherein the first and/or second cooling ribs in particular extend parallel to a direction of main light emission of the exterior aircraft light unit; and wherein the second heat sink portion is attachable to the aircraft light unit with no additional parts needed beyond those used to assemble the aircraft light unit with only the first heat sink portion attached.

14. The exterior aircraft light unit according to claim 1, wherein the aircraft light unit is operated with an electrical power of more than 10 W, and/or wherein the aircraft light unit is at least one of a landing light unit, a taxi light unit, a runway turn-off light unit and a multi-functional light unit providing at least two of the functionalities of a landing light unit, a taxis light unit, a runway turn-off light unit.

15. An aircraft comprising at least one exterior aircraft light unit according to claim 1.

* * * * *